United States Patent [19]

Trandai et al.

[11] Patent Number: 5,893,036
[45] Date of Patent: Apr. 6, 1999

[54] TRANSMISSION POWER CONTROL METHOD

[75] Inventors: Anhtuan Trandai, Gurnee; Hugh Wang, Buffalo Grove; Wayne Huang, Gurnee; Gang Sun, Hoffman Estates; Gregory R. Black, Vernon Hills; James G. Haerle, Algonquin, all of Ill.

[73] Assignee: Motorola, Inc., Schaumburg, Ill.

[21] Appl. No.: 791,695

[22] Filed: Jan. 30, 1997

[51] Int. Cl.$^6$ .................................................. H04B 7/00
[52] U.S. Cl. ............................... 455/522; 455/68; 455/69
[58] Field of Search .............................. 455/68, 69, 70, 455/422, 423, 450, 509, 517, 522; 370/252, 332

[56] References Cited

U.S. PATENT DOCUMENTS

| | | | |
|---|---|---|---|
| 5,086,508 | 2/1992 | Furuno | 455/69 |
| 5,128,965 | 7/1992 | Henrikson | 375/58 |
| 5,129,098 | 7/1992 | McGirr et al. | 455/69 |
| 5,241,690 | 8/1993 | Larsson et al. | 455/69 |
| 5,390,338 | 2/1995 | Bodin et al | 455/69 |
| 5,752,172 | 8/1996 | Matero | 455/127 |
| 5,799,091 | 8/1998 | Lodenius | 380/49 |

FOREIGN PATENT DOCUMENTS

0632584 A1  1/1995  European Pat. Off. ......... H03G 3/20

WO 94/06218  8/1993  WIPO ............................. H04B 7/005

OTHER PUBLICATIONS

European Telecommunications Standards Institute, "European digital cellular telecommunications system (phase 1); Radio sub–system link contol, Part 1: Generic (GSM 05.08)", I–ETS 300 034–1, Oct. 1993, pp. 7 and 8.

European Telecommunications Standards Institute, "GSM: Digital cellular telecommunication system (Phase 1); Mobile Station (MS) conformance specification; Part 1: Conformance specification (GSM 11.10–1)", Draft pr ETS 300 607–1, Nov. 1996, Fourth edition, p. 11.

Primary Examiner—Reinhard J. Eisenzopf
Assistant Examiner—Duc Nguyen
Attorney, Agent, or Firm—Sylvia Chen

[57] ABSTRACT

A transmission power control method subdivides one or more transmission power steps as defined in a system specification into multiple sub-steps. A base station (290) instructs a mobile station (280) to use a defined power step, and the mobile station (280) initially selects a maximum power sub-step within the requested power step during an initial RACH (225) transmission. During the duration of the call, the mobile station (280) dynamically adjusts the power sub-step based on measured signal reception quality and channel conditions. The result is an improvement in call completion rates with only a minor reduction in battery life.

16 Claims, 3 Drawing Sheets

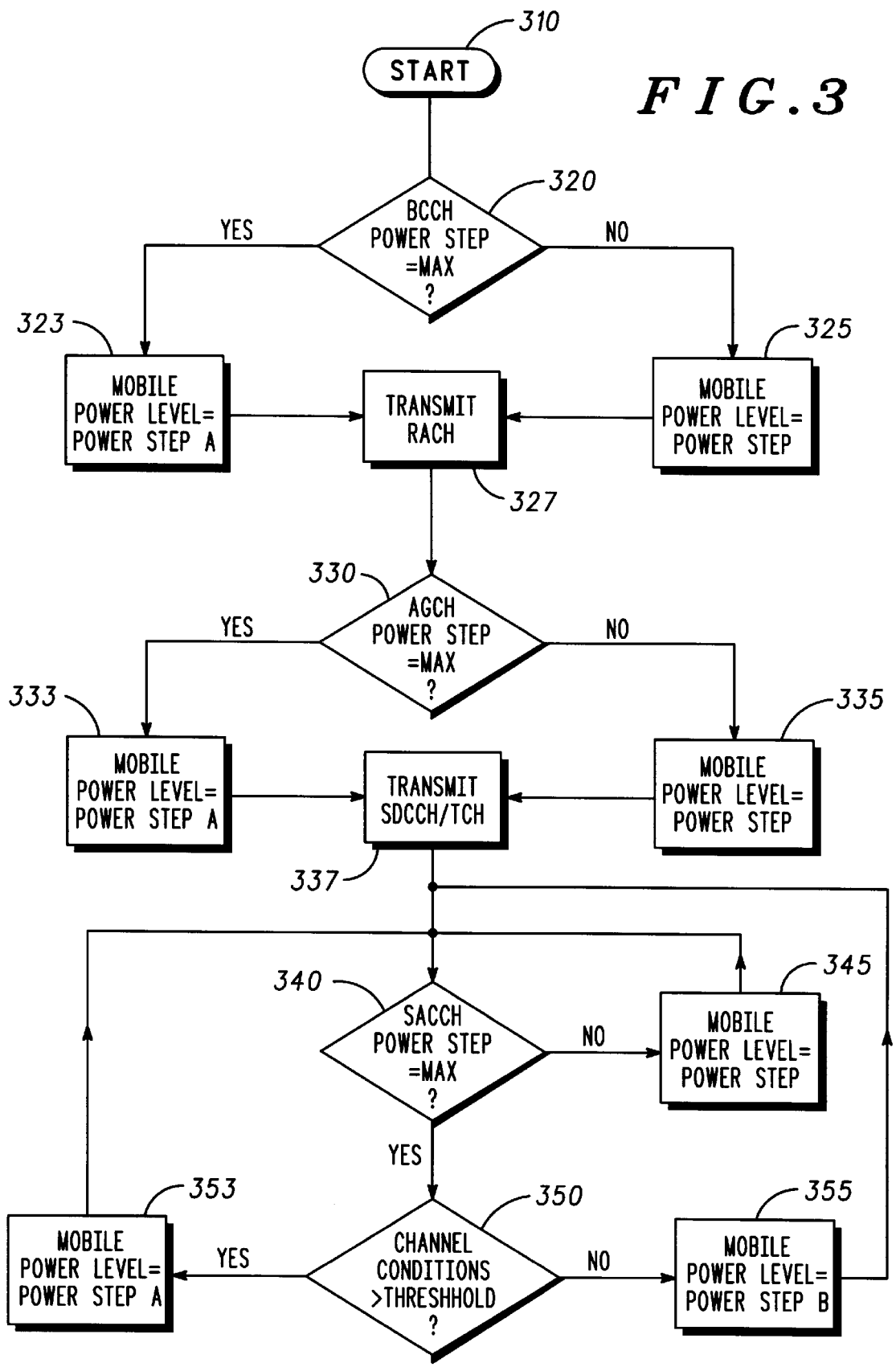

TRANSMISSION POWER CONTROL METHOD

FIELD OF THE INVENTION

This invention relates generally to radio frequency (RF) transmitters, and more particularly to a power control method for radiotelephones.

BACKGROUND OF THE INVENTION

In certain cellular communication systems, a stationary base station controls the transmission power level of a mobile station. In communication systems such as Advanced Mobile Phone Service (AMPS), Time Division Multiple Access (TDMA), and Global System for Mobile Communications (GSM), base stations instruct portable stations as to which one of several defined power steps should be used at each point in time. For example, the GSM specification defines fifteen uplink power control steps, each spaced 2 dBm apart and each having a tolerance of ±3 dBm.

A GSM base station broadcasts a power step command on a Broadcast Control Channel (BCCH) signal that is received by compatible mobile stations in its coverage area before any access attempt is made by a mobile station. Thus, when a portable telephone or other mobile station tries to contact the base station using a Random Access Channel (RACH) signal, it has instructions on which power step to use to initiate and maintain contact. A mobile station that has a maximum transmission power step lower than the power step stated in the BCCH signal simply uses the transmission power level corresponding to its maximum power step.

After a dedicated communication channel has been established between the base station and the mobile station, the base station sends further power step commands for that particular mobile station on a Slow Associated Control Channel (SACCH) signal. These further power step commands are determined based on reception level measurements performed by the base transceiver station and reception quality measurements taken and reported by the mobile station.

Base station power control allows the cellular system to improve overall spectral efficiency and also increase the battery life of the mobile station. In order to further increase the battery life of a mobile station, a portable telephone or other mobile station may transmit at a power other than the nominal power stated in the communication system specifications. For example, a GSM phone instructed to use power step 5 might transmit at 32 dBm instead of the nominal 33 dBm defined in the GSM specification. Although this lower power output increases the talk time of the phone, it may also cause a cellular telephone call to drop when a phone having a power output at the nominal 33 dBm would have successfully continued the call. If the mobile station is in a weak RF coverage area, the difference between the nominal power output and the increased talk time power output could cause the uplink signal to fail to reach the base station. Thus, there is a need for a power control system that extends the battery life of the mobile station, yet continues to obey base station power step commands and does not suffer from increased reliability problems in areas of weak RF signal coverage.

BRIEF DESCRIPTION OF THE DRAWINGS

FIG. 3 shows a flow chart of the method according to the preferred embodiment.

DETAILED DESCRIPTION OF THE PREFERRED EMBODIMENT

The transmission power control method subdivides a defined transmission power step into multiple sub-steps. The base station instructs the mobile station to use a power step as defined in a cellular system specification, however, the mobile station selects which power sub-step to use within the defined power step. In the preferred embodiment, the maximum power step is subdivided into two sub-steps. If a base station directs a mobile station to use the maximum power step during a call setup, the maximum power sub-step of the defined power step is selected by the mobile station, which improves the call completion rate. During the remainder of the call, assuming that the base station continues to instruct the mobile station to use the maximum power step, the mobile station selects between maximum and lower power sub-steps as needed to save battery power yet maintain the call depending on the real time operating conditions of the transmission channel and the mobile station. If at any time the base station instructs the mobile station to use a power step that does not contain sub-steps, the mobile station uses a power level corresponding to the defined power step as commanded. The result is an improvement in call completion rates with only a minor reduction in battery life.

Figure 1:
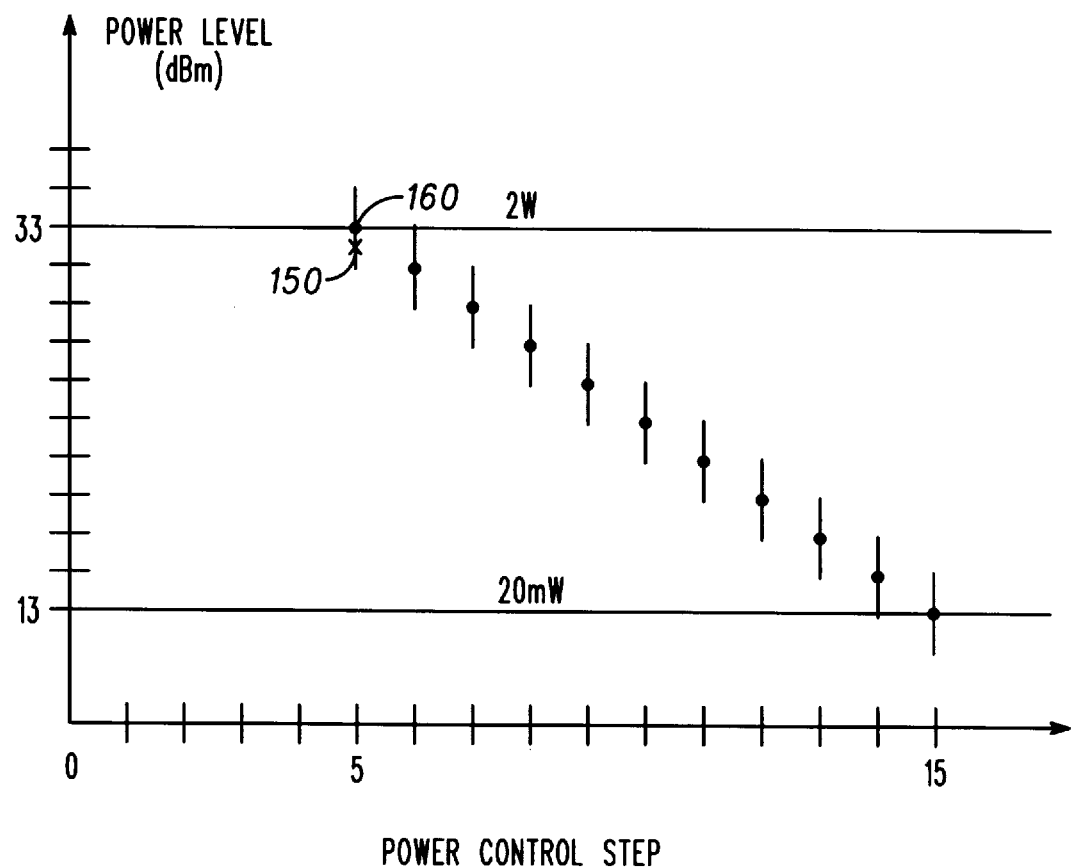
FIG. 1 shows a power control step chart for a class 4 GSM mobile station according to a preferred embodiment.

FIG. 1 shows a power control step chart for a class 4 GSM mobile station according to a preferred embodiment. A class 4 GSM mobile station has a maximum transmission power of 2 W under the GSM 900 MHz system. Typically, class 4 GSM mobile stations are handheld cellular telephones. Eleven power steps are available for class 4 devices. Maximum power step 5 has a nominal transmission power level of 33±2 dBm. Thus, in GSM, the defined power steps encompass a range of overlapping power levels. A mobile station may transmit at power levels as low as 31 dBm and as high as 35 dBm and still remain in conformance with GSM specifications for power step 5.

In the preferred embodiment, power step 5 is divided into two power sub-steps, each power sub-step having a unique nominal transmission power level. The maximum power sub-step 5A 160 has a corresponding nominal transmission power level of 33 dBm, while the lower power sub-step 5B 150 has a corresponding nominal transmission power level of 32 dBm. The remaining power steps have corresponding power levels equal to the nominal power levels stated in the GSM specification.

Power sub-steps may be implemented in various ways. For example, different nominal transmission power levels may be chosen for the power step 5 sub-steps described previously, multiple power steps can be divided into two or more sub-steps, another communication system such as the AMPS or TDMA system can have its defined power steps divided into power sub-steps, or another class of mobile station can have divided power steps. The nominal transmission power levels selected for the power sub-steps are chosen to improve factors such as spectral efficiency, call completion rates, or battery life.

Figure 2:
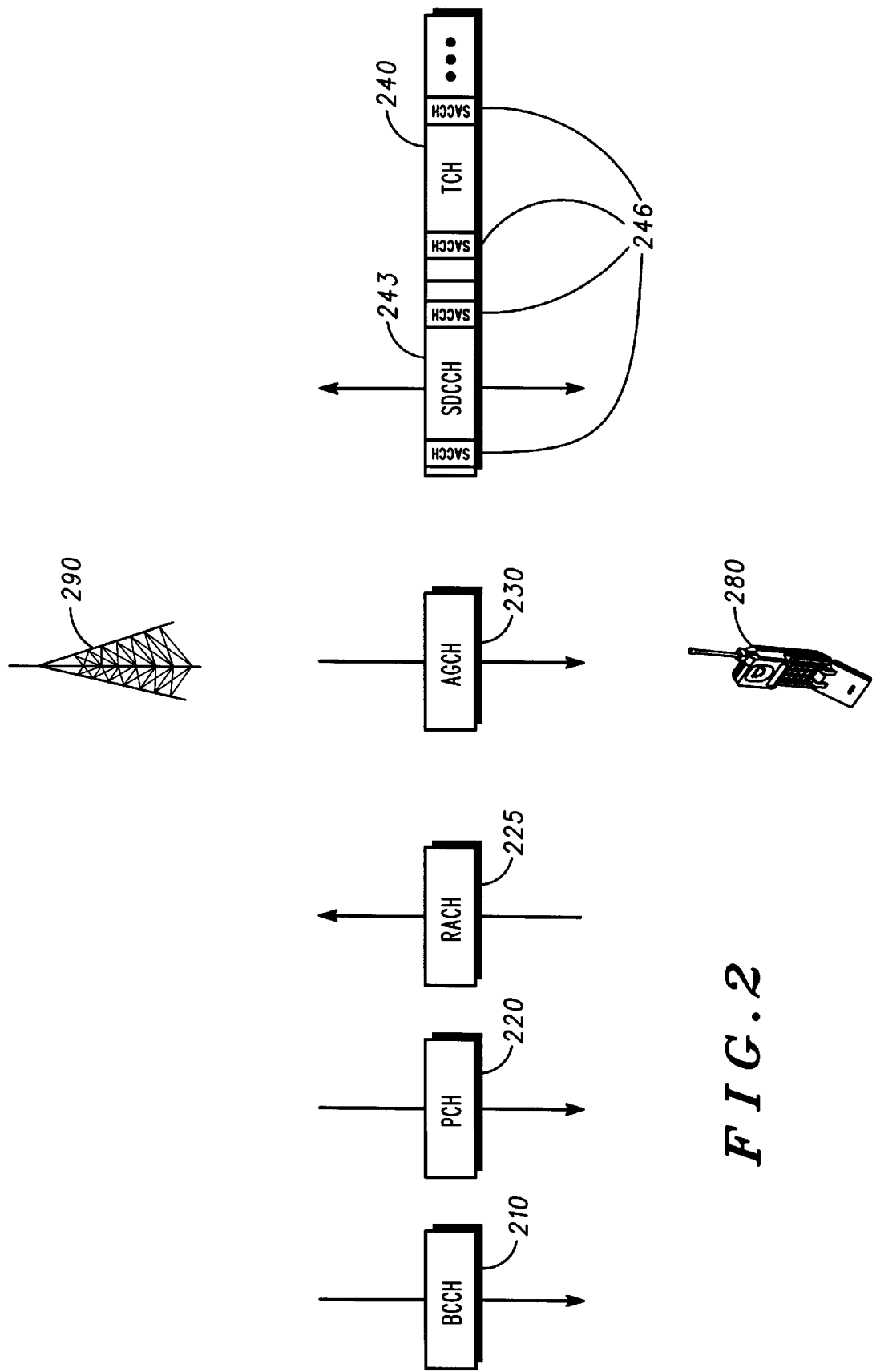
FIG. 2 shows a diagram of a mobile terminated call set up procedure according to the preferred embodiment.

FIG. 2 shows a diagram of a mobile terminated call set up procedure according to the preferred embodiment. The mobile station 280 is represented by a GSM handheld cellular telephone, however, other types of mobile stations may use the power control method with only minor modifications. The stationary base station 290 is represented as a GSM base station. The power control method can be used not only in conjunction with GSM systems, but also with AMPS, TDMA, and other systems with base station power control. An initial transmission power control step is chosen by the base station 290 based on factors such as cell configuration, cell size, and interference levels. The base station 290 broadcasts the selected power control step on a BCCH 210 signal which is received by all compatible mobile stations in the coverage area, including mobile station 280.

In the mobile terminated situation, the base station also transmits a Paging Channel (PCH) 220 signal to contact that particular mobile station 280. Before the mobile station responds to the base station PCH 220 signal, the mobile station 280 determines from the BCCH 210 signal the power step required by the base station 290. Then, the mobile station 280 transmits a RACH 225 signal at the power level corresponding to that power step. If the power step commanded in the BCCH 210 signal does not have any power sub-steps, the mobile station 280 simply uses the stated power step at the power level defined in the mobile station. If, however, the power step commanded in the BCCH 210 signal has power sub-steps, the mobile station 280 determines which sub-step is chosen for transmitting the RACH 225 signal.

In the preferred embodiment, only maximum power step 5 is divided into sub-steps 5A and 5B. Thus, if the power step stated in the BCCH 210 signal is less than the maximum power step, e.g., one of power steps 6–15 for a class 4 device, the mobile station 280 will use the transmission power level set in the mobile station 280 corresponding to the power step commanded in the BCCH 210 signal. If, however, the power step stated by the BCCH 210 signal requires the maximum power step available to the mobile station, e.g. one of power steps 1–5 for a class 4 device, the mobile station 280 must determine which sub-step, 5A or 5B, to use. In the preferred embodiment, the mobile station transmits a RACH 225 signal at the power level corresponding to maximum power sub-step 5A whenever power step 5 is requested in a BCCH signal. The maximum power sub-step 5A is used in order to give the RACH signal the best chance of reaching the base station even in areas of weak RF coverage.

If the base station 290 receives the RACH 225 signal, the base station returns an Access Grant Channel (AGCH) 230 signal which includes a description of the allocated channel, initial timing advance information, and transmission power commands. After receiving the AGCH 230 signal from the base station 290, the mobile station 280 starts sending signals to the base station using the transmission power level corresponding to the power step commanded in the AGCH 230 signal. Again, if the power step command in the AGCH 230 signal is associated with no power sub-steps in the mobile station 280, the mobile station 280 uses the power level corresponding to the AGCH power step command. If, however, the AGCH power step command corresponds to the mobile station's maximum power step 5, which has two sub-steps, a transmission power level corresponding to maximum power sub-step 5A is used.

At this time, the base station 290 and the mobile station 280 communicate using a Stand-Alone Dedicated Control Channel (SDCCH) 243 signal, which precedes a Traffic Channel (TCH) 240 signal. During SDCCH 243 and TCH 240 signaling, the base station's power control commands are transmitted on an SACCH 246 signal, which is a bi-directional channel used primarily for non-urgent signaling messages. An SACCH uplink includes the mobile station's reception quality measurement report, and an SACCH downlink includes power control and timing advance commands. The SDCCH 243 signal is primarily a call set-up control signal, however, it is not necessary in all situations. In certain circumstances, call set-up control is conducted on a TCH 240 signal without having a preceding SDCCH 243 signal.

During the TCH 240 signaling, the mobile station 280 monitors existing channel conditions and alters the transmission power sub-step as appropriate while remaining within the power step specified by the base station 290. For example, the bit-error rate (BER) of a received signal can be measured by the mobile station. If the BER is above a predetermined threshold, obtained using experimental data or simulation data, the mobile station will use a maximum power sub-step, such as power sub-step 5A, to increase reliability. If, however, the BER falls below the predetermined threshold, the mobile station will use a lower power sub-step, such as power sub-step 5B, to conserve battery energy. Other signal quality or channel condition criteria, such as signal strength or distance from the mobile station to the base station, can be used in addition to or instead of BER to determine when the mobile station should switch between power sub-steps. If, in an SACCH 246 signal, the base station 290 calls for a power step that does not correspond to any sub-steps, the mobile station 280 uses the requested power step at the power level set in the mobile station 280.

A mobile originated call set up procedure is almost identical to a mobile terminated call set up procedure. The main difference is that the base station does not transmit a PCH 220 signal to initiate a call, instead the mobile station transmits a RACH 225 signal to initiate a call, without ever receiving a PCH 220 signal. The remaining signaling, however, is the same. The power control method is applicable to both mobile terminated and mobile originated calls.

FIG. 3 shows a flow chart of the method according to the preferred embodiment. After the start step 310, in step 320 the mobile station receives a BCCH signal and evaluates whether the power step commanded in the BCCH signal calls for the maximum transmission power step of the mobile station, i.e., a power step having sub-steps. If the maximum power step is requested, in step 323 the mobile station transmission power level is set to correspond to the requested power step at the maximum sub-step A. Otherwise, in step 325, the mobile station is set to transmit at the power level corresponding to the requested power step.

Next, in step 327, the mobile station transmits a RACH signal at the transmission power level according to either step 323 or step 325. In step 330, the mobile station receives an AGCH response from the base station and evaluates whether it requested the maximum transmission power step, i.e., a power step having sub-steps. If the AGCH signal calls for the maximum transmission power step of the mobile station, step 333 sets the transmission level to correspond to the requested power step at sub-step A. Otherwise, the mobile station transmission power level is set to correspond to the requested power step in step 335.

The mobile station then transmits an SDCCH or TCH signal in step 337. The mobile station evaluates the transmission power step command in the return SACCH signal from the base station in step 340. If the base station does not request the maximum transmission power step of the mobile station, the mobile station power level is set to correspond to the requested power step in step 345 and returns to step 340 to await new SACCH power step commands from the base station.

If the maximum transmission power step is requested, in step 350 the mobile station evaluates whether the channel conditions exceed a predetermined threshold. If the channel conditions exceed the threshold, the mobile station power level is set to correspond to maximum power sub-step A in step 353. If the channel conditions do not exceed the threshold, the mobile station power level is set to correspond to lower power sub-step B in step 355 to conserve battery power. During hand over and in preparation to receive further SACCH power step instructions, the mobile station returns to step 340 after completing either step 353 or step 355.

The mobile station constantly evaluates the power step commands from the base station and the channel conditions to determine which power sub-step should be used by the mobile station. Thus, even under changing signal quality and channel conditions, the mobile station transfers between sub-steps within the step commanded by the base station in order to optimize battery life without sacrificing call completion rates.

Thus, the transmission power control method allows the base station to maintain general power control of the mobile station yet allows the mobile station to make fine power level decisions to maximize the battery life of the mobile station without sacrificing reliability. While specific components and functions of the transmission power control method are described above, fewer or additional functions could be employed by one skilled in the art within the true spirit and scope of the present invention. The invention should be limited only by the appended claims.

We claim:

1. A method of transmission power control in a communication system having a mobile station transmitting to a base station, the communication system defining power steps of a mobile station as encompassing a specified range of power levels, comprising the steps of:

selecting a particular power step of the mobile station;

dividing the particular power step into a plurality of power sub-steps having a higher power sub-step and a lower power sub-step;

assigning a unique nominal transmission power level, within the specified range of power levels encompassed by the particular power step, to each one of the plurality of power sub-steps;

obtaining, at the mobile station, a command from the base station instructing the mobile station to use a certain power step;

determining if the certain power step is also the particular power step;

if the certain power step is also the particular power step: identifying whether a channel condition exceeds a predetermined threshold;

if the channel condition exceeds the predetermined threshold:

electing the higher power sub-step as said one of the plurality of power sub-steps; and if the channel condition does not exceed the predetermined threshold:

electing the lower power sub-step as said one of the plurality of power sub-steps;

transmitting a signal from the mobile station, at the unique nominal transmission power level assigned to said one of the plurality of power sub-steps; and if the certain power step is not also the particular power step:

transmitting a signal, from the mobile station, at a power level within the specified range of power levels encompassed by the certain power step.

2. The method according to claim 1 wherein the higher power sub-step is a maximum power sub-step.

3. The method according to claim 1 wherein the step of obtaining comprises the step of:

receiving a Broadcast Control Channel signal from the base station.

4. The method according to claim 3 wherein the step of obtaining further comprises the step of:

receiving a Paging Channel signal from the base station.

5. The method according to claim 1 wherein the step of transmitting a signal comprises the step of:

sending a Random Access Channel signal from the mobile station.

6. The method according to claim 1 further comprising the step of:

acquiring, at the mobile station, a further command from the base station instructing the mobile station to use a further power step.

7. The method according to claim 6 wherein the step of acquiring comprises the step of:

receiving an Access Grant Channel signal from the base station.

8. The method according to claim 6 wherein the step of acquiring comprises the step of:

receiving a Slow Associated Control Channel signal from the base station.

9. The method according to claim 6 further comprising the steps of:

determining if the further power step is also the particular power step;

if the further power step is also the particular power step:

choosing one of the plurality of power sub-steps that are associated with the particular power step;

transmitting a further signal, from the mobile station, at the unique nominal transmission power level assigned to said one of the plurality of power sub-steps; and if the further power step is not also the particular power step:

transmitting a further signal, from the mobile station, at a power level within the specified range of power levels encompassed by the further power step.

10. The method according to claim 9 wherein the step of transmitting a further signal comprises the step of:

sending a Traffic Channel signal from the mobile station.

11. The method according to claim 1 wherein the channel condition is a bit error rate.

12. The method according to claim 1 wherein the channel condition is a signal strength measurement.

13. The method according to claim 1 wherein the channel condition is a distance from the mobile station to the base station.

14. A method of transmission power control in a communication system having a mobile station transmitting to a base station, the communication system defining power steps of a mobile station as encompassing a specified range of power levels, comprising the steps of:

choosing a maximum power step of the mobile station as a particular power step of the mobile station;

dividing the particular power step into a plurality of power sub-steps having a higher power sub-step and a lower power sub-step;

assigning a unique nominal transmission power level, within the specified range of power levels encompassed by the particular power step, to each one of the plurality of power sub-steps;

obtaining, at the mobile station, a command from the base station instructing the mobile station to use a certain power step;

determining if the certain power step is also the particular power step;

if the certain power step is also the particular power step:

identifying whether a signal type of the command from the base station is a predetermined signal type;

if the signal type is a predetermined signal type:
  electing the higher power sub-step as said one of the plurality of power sub-steps; and if the signal type is not a predetermined signal type:
  electing the lower power sub-step as said one of the plurality of power sub-steps;

transmitting a signal, from the mobile station, at the unique nominal transmission power level assigned to said one of the plurality of power sub-steps; and if the certain power step is not also the particular power step:
  transmitting a signal, from the mobile station, at a power level within the specified range of power levels encompassed by the certain power step.

15. The method according to claim 14 wherein the step of dividing the particular power step comprises the step of:
  partitioning the particular power step into a maximum power sub-step and at least one lower power sub-step.

16. The method according to claim 15 wherein the command from the base station is a Broadcast Control Channel signal, the predetermined signal type is a Broadcast Control Channel, and the signal, from the mobile station, is a Random Access Channel signal.

* * * * *